United States Patent [19]

Saeed

[11] Patent Number: 4,707,910

[45] Date of Patent: Nov. 24, 1987

[54] METHOD OF ASSEMBLING ELECTRIC MOTORS

[75] Inventor: Abdul Saeed, Hunstetten, Fed. Rep. of Germany

[73] Assignee: Black & Decker Inc., Newark, Del.

[21] Appl. No.: 871,150

[22] Filed: Jun. 5, 1986

Related U.S. Application Data

[63] Continuation of Ser. No. 701,931, Feb. 15, 1985, abandoned.

[30] Foreign Application Priority Data

Feb. 25, 1984 [DE] Fed. Rep. of Germany ....... 3406906

[51] Int. Cl.$^4$ ............................................ H02K 15/02
[52] U.S. Cl. ........................................ 29/596; 310/42; 310/216
[58] Field of Search ................. 29/596, 598; 310/42, 310/50, 40 MM, 216

[56] References Cited

U.S. PATENT DOCUMENTS

| | | | |
|---|---|---|---|
| 2,294,322 | 8/1942 | Van Der Woude | 175/21 |
| 2,330,824 | 10/1943 | Granfield | 29/155.5 |
| 2,712,084 | 6/1955 | Bridenbaugh | 310/216 |
| 2,764,802 | 10/1956 | Feiertag | 29/155.58 |
| 2,982,873 | 5/1961 | Simmons et al. | 310/258 |
| 3,014,140 | 12/1961 | Tupper | 310/71 |
| 3,054,027 | 9/1962 | Barrick | 317/158 |
| 3,156,838 | 11/1964 | Winther | 310/42 |
| 3,365,687 | 1/1968 | Capell | 336/210 |
| 3,436,574 | 4/1969 | Larsson | 310/194 |
| 3,443,137 | 5/1969 | McElroy | 310/216 |
| 3,502,922 | 3/1970 | Welker | 310/217 X |
| 3,644,767 | 2/1972 | Kasargod | 310/254 |
| 3,694,903 | 10/1972 | Deming | 29/596 |
| 4,071,787 | 1/1978 | Lautner et al. | 310/42 |

FOREIGN PATENT DOCUMENTS

| | | |
|---|---|---|
| 1613202 | 4/1970 | Fed. Rep. of Germany . |
| 204807 | 12/1983 | German Democratic Rep. . |
| 254374 | 12/1948 | Switzerland . |

OTHER PUBLICATIONS

European Search Report.

*Primary Examiner*—Carl E. Hall
*Attorney, Agent, or Firm*—Edward D. Murphy; Harold Weinstein; Edward D. C. Bartlett

[57] ABSTRACT

A laminated core of a stator of a universal motor consists of two core parts each of which bounds a portion of a central opening through the stator. The stator has at least one field winding, and at least one longitudinal part of this field winding, running in the direction of the longitudinal axis of the stator, is located through the central opening. The core parts are separated from one another at junction planes which run substantially parallel to the plane in which the two longitudinal parts of the field winding are located. The two core parts of the stator, the field winding or windings, and the armature are all assembled by relative movement along a single direction, thus facilitating automation of this assembly.

7 Claims, 3 Drawing Figures

METHOD OF ASSEMBLING ELECTRIC MOTORS

This is a continuation of application Ser. No. 701,931, filed Feb. 15, 1985, now abandoned.

FIELD OF THE INVENTION

This invention relates to electric motors and their method of assembly. It particularly relates to the construction and assembly of the stator assembly, especially in universal motors as used, for example, in portable hand tools.

BACKGROUND OF THE INVENTION

Constructing electric motors in a manner that facilitates their assembly, and devising lower cost methods of assembling such motors, have received much attention over many years.

It has been proposed for various reasons to construct the laminated stator core from at least two core parts which are assembled together, as disclosed in U.S. Pat. Nos. 4,071,787; 3,436,574; 3,365,687; 3,443,137; 3,054,027; 2,330,824; 3,014,140; 2,294,322; and 2,982,873.

In U.S. Pat. No. 3,436,574 the laminated core has a substantially rectangular shape in cross-section with poles, which partially surround a rotatably supported armature, extending into a central opening from two opposite sides of the laminated core. The rotational axis of the armature, as is usual, forms the longitudinal axis of the stator. The core is formed by a U-shaped core part, which includes the inwardly extending poles, and a yoke which is fastened across the free ends of the arms of the U-shaped core part. A field winding encircles the yoke. Due to the inwardly extending poles, the arcuate inner surfaces of which closely surround the armature, the armature must be assembled axially into and through the central space between the poles by movement along the longitudinal axis of the stator.

Similarly, in the case of other stators, the armature is assembled into the stator assembly axially by movement along the longitudinal axis of the stator.

In assembling electric motors generally it should be noted that assembly movements take place along several different directions.

SUMMARY OF THE INVENTION

Assembly movements along different directions of movement when asembling an electric motor, including the stator assembly thereof, make assembly by machinery very difficult, it not at times virtually impossible.

The present invention stems from the concept that if all the major assembly steps were to be carried out by movement along only one direction, then such assembly procedure would facilitate automatic assembly of electric motors by machinery.

It is the object of the present invention to provide a stator assembly for an electric motor, particularly a universal motor, that will enable the electric motor to be assembled in a simpler manner more suitable for automation by machinery.

It is a further object of the invention to provide a method of assembling an electric motor whereby major assembly steps can be carried out by movement along the same direction.

There is provided, therefore, according to the present invention a method of assembling an electric motor, the motor having a stator core comprising two core parts, one or more field windings and an armature rotatable in a central opening in the stator core about a longitudinal axis of the stator core, comprising the steps of positioning the armature in one of the core parts by relative movement between the armature and said one core part in a direction transverse to said longitudinal axis, and then assembling the other core part to said one core part by relative movement therebetween in said direction.

A field winding, or depending upon the motor construction two field windings, can be assembled on one of the core parts before assembling the core parts together, such field winding assembly also being by relative movement along the same direction in which the armature and the core parts are assembled.

The core parts preferably each have a leg portion at one side, the leg portion of one core part having a longitudinal rib which is engaged in a longitudinal groove along the leg portion of the other core part.

Advantageously, the or one of the field windings may be placed over the leg portion of one core part and then the leg portion of the other core part partially inserted into the field winding with the two leg portions engaging each other inside the field winding.

Alternatively, a field winding may be assembled over a pole of each core part with each field winding encircling its respective pole in the stator core central opening.

In a preferred embodiment, one core part is first placed in a half-shell of a housing, then after the core parts are assembled another half-shell of the housing is placed over the other core part. The housing may be that of a tool and also function to hold the two core parts together in the assembled motor.

The above assembly operations can take place along a common direction of assembly and may be performed by machinery.

According to the present invention there is also provided an electric motor comprising a stator having a core with a central opening through which is disposed an armature which is relatively rotatable about a longitudinal axis of the stator, at least one field winding encircling a portion of the stator, said core comprising first and second core parts each defining a part of the central opening, these core parts joining in at least one junction plane which is parallel to said longitudinal axis and intersects the central opening, and said portion of the stator extends through the field winding in a direction at right angles to the junction plane, whereby during assembly of the electric motor the armature can be assembled in the first core part by relative movement therebetween in said direction and the second core part can then be assembled to the first core part by relative movement therebetween in the same direction.

The, or each, field winding may comprise two spaced apart longitudinal portions which extend on opposite sides of one, or more, portions of the stator core parallel to the stator's longitudinal axis, these longitudinal portions being spaced apart in a direction parallel to the junction plane and at right angles to the stator's longitudinal axis. Preferably, the longitudinal portions of the or each field winding lie effectively in the junction plane or in a plane parallel thereto.

In one embodiment the core parts join in only one junction plane, in another embodiment they join in two spaced apart but parallel junction planes, and in yet another embodiment they join in two laterally spaced apart locations in a common junction plane. In all cases the armature is capable of being inserted transversely in one core part and then the other core part assembled transversely along the same direction.

In the area of the junction plane, or in the case of two junction planes in the area of at least one of these, one of the core parts is preferably provided with a groove extending in the direction of the longitudinal axis, and the other core part is provided with a rib shaped correspondingly to this groove and extending in the same direction. The rib engages in the groove to both locate the two core parts positively with respect to each other, and to provide good continuity of the magnetic flux path through the stator core.

Other objects, features and advantages of the present invention will become more fully apparent from the following detailed description of the preferred embodiment, the appended claims and the accompanying drawings.

DETAILED DESCRIPTION OF THE PREFERRED EMBODIMENTS

Figure 1:
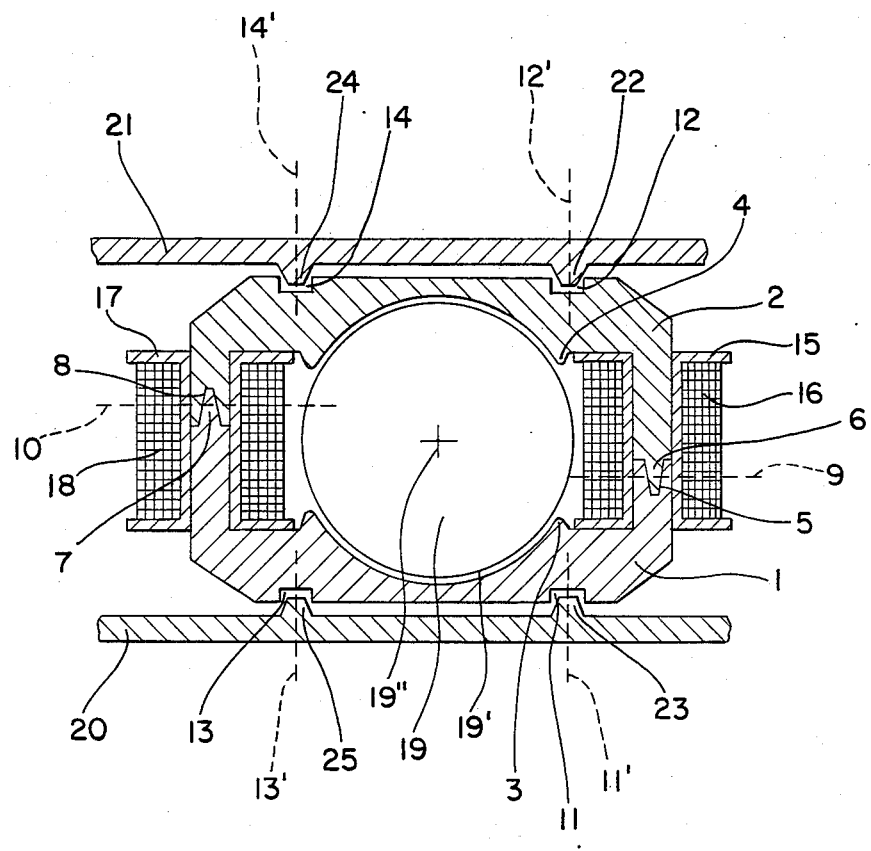
FIG. 1 shows diagrammatically a section through a universal motor according to the invention, at right angles to the axis of rotation, the motor being supported in a housing comprising two partially shown housing shells.

FIG. 1 shows a universal motor according to the invention having a stator which has a laminated core or stator stack consisting of two mating core parts 1, 2 forming a central opening 19' therebetween. Each of the core parts 1, 2 has a central pole 3, 4, which forms a circular part of the boundary of the central opening 19'. An armature 19 is located in the central opening 19', and this armature is rotatable about its longitudinal axis indicated by 19", this longitudinal axis 19" also forming the longitudinal axis of the stator and the axis of rotation of the motor.

Field windings 16 and 18 are each wound about coil carriers 15, 17 respectively. In the assembled condition of the stator shown, these coil carriers respectively encircle the side portions of the laminated core 1, 2.

In this way, the axially longitudinal parts of the field windings 16 and 18, which extend parallel to the longitudinal axis 19", on the one hand through the interior space of the stator between the side portions of the core parts 1, 2 and the armature and, on the other hand, axially outside the stator. The field windings 16, 18 are formed with transverse sections at the front and rear ends of the stator, these transverse sections each forming a connection between the axial longitudinal parts of the field windings 16, 18. The ends of the wires of the field windings are, of course, attached in the usual manner to stator terminals, and can be connected by the latter into the circuit of the motor, including carbon brushes that engage a commutator section of the armature 19.

The separate core parts 1 and 2 are interengaged with each other, as shown, along parallel planes 9 and 10 (indicated by broken lines) located at different heights. In the region of the junction plane 9, the lower core part 1 has on the right side a substantially trapezoidal longitudinal groove 5. This groove 5 opens upwardly and becomes narrower towards its bottom, and extends in the direction of the longitudinal axis 19". Also in the region of the junction plane 9, the upper core part 2 has a correspondingly trapezoidal shaped longitudinal rib 6 which, in the assembled condition of the core parts 1 and 2 as shown, fits snugly into the groove 5. Similarly, the upper core part 2 has at its opposite side a trapezoidal groove 8 which faces downwardly and gets narrower towards its upper base. A mating trapezoidal longitudinal rib 7 of the lower core part 1 engages, as shown, snugly into the groove 8. The groove 8 and rib 7 interengage in the region of and along the junction plane 10. In this way, the two core parts 1 and 2 are located exactly relative to one another in the transverse direction (i.e. the horizontal direction in FIG. 1) so that the magnetic field lines in the laminated core run substantially as they would if the laminated core consisted of one single core, as is the case with the laminated stator stack usually employed in universal motors.

The laminated core shown has, in cross-section, a substantially rectangular peripheral shpae with chamfered corners, and the junction planes 9, 10 intersect the short sides of the rectangle. The long sides of the rectangle are parallel to the junction planes 9, 10. In the external surface of these long sides are pairs of grooves 11, 13, and 12, 14, which each have a rectangular cross-section and extend parallel to the longitudinal axis 19". The grooves 11, 13 and 12, 14 thus lie in planes 11', 13', 12' and 14', respectively, which are at right angles to the general plane in which the longitudinal parts of the windings 16 and 18 are located and which, therefore, are also at right angles to the junction planes 9 and 10. Location ribs 23 and 25 are formed on a partially shown housing lower half-shell 20 and engage in the grooves 11 and 13. While location ribs 22 and 24 are formed on the other housing half-shell 21 and engage in the grooves 12 and 14. The half-shells 20, 21 may form a tool housing, for example they may advantageously be a pair of clam-shell housing parts of a portable electric tool such as a drill. The interengaging ribs 22, 23, 24, 25 and longitudinal grooves 12, 11, 14, 13 locate and hold the motor in position in the tool housing, and also retaining the two core parts 1, 2 in tight interengagement with each other. The full half-shells 20, 21 are each concave and enclose the motor 1, 2, 19 therebetween.

In order to manufacture and assemble an electric motor as shown in FIG. 1, the core parts 1 and 2 are manufactured initially in the same manner as the conventional laminated stator stacks of motors. In addition, the windings 16 and 18 are wound onto their respective coil carriers 15 and 17 on a separate machine. The core part 1 is inserted downwardly into the housing half-shell 20 so that the location ribs 23 and 25 engage upwardly into the grooves 11 and 13. The coil carriers 15, 17, carrying the windings 16 and 18, are then placed downwardly over and onto the upwardly extending free legs, i.e. side portions, of the core part 1. As will be appreciated, the side portions of the bottom core part 1 will only extend partly upwardly inside the coil carriers 15, 17 to the location of the junction planes 9, 10, respectively. The armature 19 is then inserted downwardly into position between the longitudinal coils 16,18, bearings on the shaft of the armature engaging support locations provided in the half-shell 20 to support the armature 19. The core part 2 is then moved downwardly on top so that the locational engagement between the grooves 5 and 8 and the ribs 6 and 7 takes place. The armature 19 is now closely surrounded top and bottom by the arcuate surfaces of the poles 4, 3. Alignment of the core parts 1 and 2 in the direction of the longitudinal axis 19" is carefully effected, so that stepless end surfaces of the laminated core are achieved. After any further parts and components of the tool or device are placed in the lower half-shell 20, and any necessary wiring connections made, the half-shell 21 is placed downwardly upon the half-shell 20 so that the location ribs 22, 24 extend into the grooves 12, 14. The two half-shells 20, 21 are then secured together, e.g. by screws, so that the stator and the complete electric motor are held so that they cannot be displaced within the housing 20, 21. In addition, the core parts 1 and 2 cannot be displaced relative to one another because they are held together, on the one hand, by engagement of their ribs and grooves in the region of their junction planes 9 and 10 and, on the other hand, by the casing halves. The field windings 16, 18 are also held so that they cannot be displaced because the coil carriers 15, 17 are contacted by upper and lower location surfaces formed in the internal surface of the core parts 1, 2. As can be clearly seen in FIG. 1, these location surfaces are recessed into the long sides of the core parts adjacent the junctions with the short sides and closely engage the inner longitudinal parts of the field windings 16, 18. Additionally, transverse support ribs may be formed on the half-shells 20, 21 and prevent displacement or movement of the laminated core 1, 2 or of the stator assembly in the direction of the longitudinal axis 19'.

It should particularly be noted that in the above assembly procedure, the total assembly is carried out in one single direction only, i.e. from the top towards the bottom in FIG. 1. Assembly procedure of this type can be very easily carried out by machine. By splitting the laminated stator stack into two parts as described, and inserting the armature into position in the same direction as the two parts of the stator stack and the field windings are assembled, automation of the motor assembly is simplified.

Figure 2:
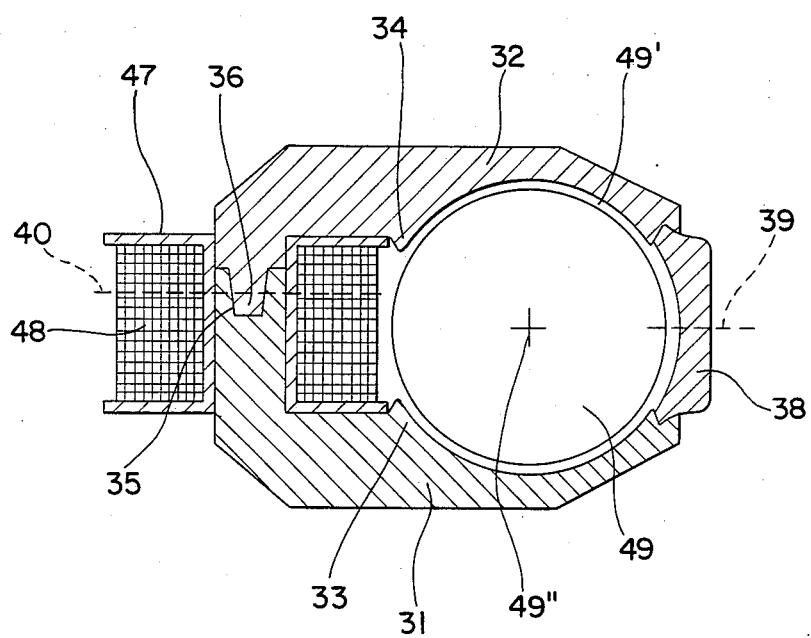
FIG. 2 shows diagrammatically a section through another universal motor according to the invention, at right angles to the axis of rotation, this motor being in the form of a horseshoe motor.

FIG. 2 illustrates a so-called horseshoe motor which is, however, constructed according to the invention on the same principle as the motor shown in FIG. 1. Thus the stator has a laminated core made up of two separate core parts 31, 32 which are separated in the region of junction planes 39 and 40. On the left-hand side of FIG. 2 the two core parts 31 and 32 are positively connected together by means of a trapezoidal groove 35 in the core part 31 and a corresponding trapezoidal rib 36 formed on the core part 32. The groove 35 narrows towards its bottom and extends lengthwise in the core part 31 in the direction of the rotational axis 49" of the armature, this also being the longitudinal axis of the stator. In the region of the junction plane 40 thus formed, there is a field winding 48 which is wound on a coil carrier 47. This coil assembly has two longitudinal portions which run at right angles to the plane of FIG. 2. One such longitudinal portion runs inside the stator lengthwise in a channel communicating with one side of a central circular opening 49' through the stator. The other longitudinal portion runs outside the central opening 49', i.e. along the exterior of the stator core 31, 32. The core parts 31, 32 have arcuate poles 33, 34, respectively, formed facing towards and circumscribing the central opening 49' and surrounding diametrically opposed sides of the armature 49 rotatably located in the central opening 49'.

In the region of the junction plane 39 on the right in FIG. 2, core parts 31, 32 are spaced apart a definite distance from each other, the core parts 31, 32 so defining a horseshoe shape. A supporting block 38 of magnetically non-conducting material is provided in this region. This block 38 engages in the spaced apart free ends of the core parts 31, 32, and locates and supports them in position.

This motor is also assembled in such a way that the field winding 48, wound in a separate manufacturing step on the coil carrier 47, is first placed downwardly on the upwardly directed left hand side portion of core part 31, the armature 49 is then inserted downwardly transversely to its rotational axis, and then the support block 38 is placed on the free end of the core part 31.

Then follows the downward placing of the core part 32 to provide the construction shown in FIG. 2. The motor so constructed can be held together in a similar manner to that shown in and described with respect to FIG. 1, although other devices, such as clamps, etc., can be used for holding it together. If necessary, bonding can be used between the upper and lower ends of the support block 38 and recesses in the free ends of the core parts in which they engage. The rib 36 is preferably a tight fit in the groove 35, but bonding may also be used between these, as bonding may also be used between the ribs 6, 7 and their respective grooves 5, 8 in FIG. 1.

Figure 3:
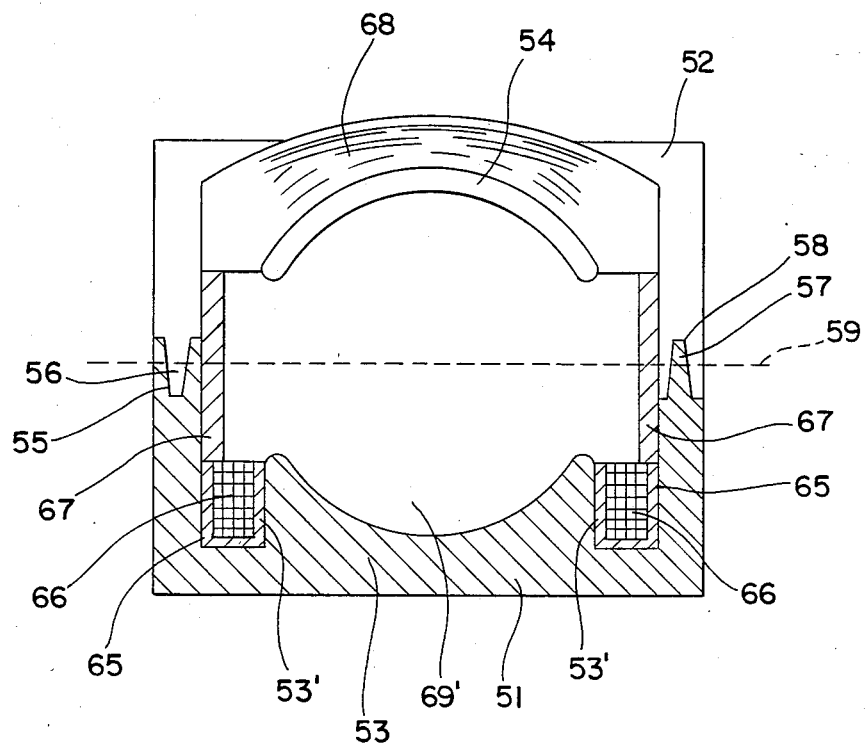
FIG. 3 shows diagrammatically, partially as end view and partially in section, another embodiment of a stator according to the invention with field windings laid around the poles of the stator.

FIG. 3 illustrates a third embodiment of the invention and shows an end view of a stator assembly in the upper half, and a cross-section of the stator assembly in the lower half. The laminated stator is formed by two core parts 51, 52 which are connected, on the one hand, by means of a longitudinal groove 58 in the upper core part 52 and a corresponding mating rib 57 on the lower core part 51 and, on the other hand, by means of a similar groove 55 in the core part 51 and a similar rib 56 on the core part 52. The design of the grooves and ribs corresponds to those of the motor of FIG. 1. However, the grooves 55, 58 and ribs 56, 57 are located at the same height and in a common junction plane 59 which bisects the central opening 69'.

The central region of a central opening 69' of the stator is bounded by curved surfaces of opposing poles 53, 54, the latter also form side walls 53' of channels for accepting the longitudinal portions of field windings 66, 68, as can be seen in the lower part of FIG. 3. The surfaces 53' of the poles bounding these channels extend substantially parallel to one another. However, the opposed side surfaces of these channels may converge so that the longitudinal portions of the winding 66 wound on the coil carrier 65 can be placed in the channels without difficulty.

To assemble the stator assembly of FIG. 3, the previously manufactured field winding 66 is placed in the lower core part 51 so that the field winding surrounds the pole 53. The other field winding 68 is also placed so as to surround the corresponding pole 54 in the upper core part 52. It should be noted that in the upper half of FIG. 3, substantially only the front transverse portion of the field winding 68 protruding beyond the front end of the laminated core can be seen; this transverse portion, and a similar transverse portion at the rear of the laminated core, connecting two longitudinal portions similar to those shown in section in the lower half of FIG. 3. Spacers 67 are then placed downwardly onto the field winding 66 or on its coil carrier 65. Next an armature, not shown, is inserted downwardly into position in a similar manner to armature 19 in FIG. 1. Finally, the upper core part 52, including the field winding 68, is then placed from above onto the lower core part 51 so that the ribs 56, 57 engage snugly into the grooves 55, 58. In this assembled position, the spacers 67 hold the field windings in position in their channels each side of the poles 53, 54. This motor may be held in position between two housing half-shells as shown in and described with respect to FIG. 1.

It will be appreciated that in all the above embodiments, the two core parts of the stator, the field winding or windings, and the armature are all assembled by relative movement in a single direction, thus facilitating automation of this assembly by machinery.

Also, in the above embodiments, the two longitudinal parts of each field winding effectively run along a plane which is parallel to or coplanar with the junction plane or planes.

It should also be noted that in the embodiments of FIGS. 1 and 2, by inserting the short side leg portions of the core parts into, and interengaging them part way through, a field winding, further location and stabilization of the assembled core parts is achieved. These short side leg portions extend parallel to the common direction of assembly.

The above described embodiments, of course, are not to be construed as limiting the breadth of the present invention. Modifications, and other alternative constructions, will be apparent which are within the spirit and scope of the invention as defined in the appended claims.

What is claimed is:

1. A method of assembling an electric motor, the motor having a stator core comprising two core parts, one or more field windings, and an armature rotatable in a central opening in the stator core about a longitudinal axis of the stator core, comprising the steps of:
    positioning the armature in one of the core parts by relative movement between the armature and said one core part in a direction transverse to said longitudinal axis;
    then assembling the other core part to said one core part by relative movement therebetween in said direction;
    assembling at least one field winding on said one core part before assembling said other core part to said one core part, said at least one field winding and said one core part being assembled by relative movement therebetween in said direction;
    placing a spacer between the two core parts before the two core parts are assembled together; and
    assembling a second field winding on said other core part before assembling said core parts together, and engaging said spacer between said field windings to space the latter apart when the two core parts are assembled together.

2. The method of claim 1, comprising winding said at least one field winding on a coil carrier before assembling said at least one field winding on said one core part.

3. The method of claim 1, comprising engaging a longitudinal rib parallel to said longitudinal axis in a longitudinal groove during assembling said core parts, said rib and said groove being formed on different ones of said core parts.

4. The method of claim 2, comprising engaging at least a portion of said coil carrier in a recess in said one core part during the assembling of said at least one field winding on said one core part.

5. The method of claim 1, comprising assembling said core parts between two housing half-shells, said half-shells being assembled by relative movement therebetween in said direction after assembling said core parts together.

6. The method of claim 5, wherein said one core part is placed in one of said half-shells before assembling said core parts, and said other half-shell is placed over said other core part after assembling said core parts.

7. A method of assembling a motor having a stator core comprising two core parts, at least one field winding, and an armature rotatable in an opening through the stator core about a rotational axis of the stator core, comprising the steps of:
    assembling the armature in one of the core parts;
    engaging said field winding over a portion of said one core part so that said portion extends partially through said field winding;
    assembling the other core part to said one core part to enclose said armature between said core parts;
    engaging a portion of said other core part in and partially through said field winding during said assembling of the other core part to said one core part to connect said core part portions together inside said field winding and complete the stator core through said field winding;
    the two core parts, the field winding and the armature all being assembled by relative movement in a single direction perpendicular to said rotational axis; and
    engaging a supporting block of magnetically non-conducting material between said core parts at a location spaced from said core part portions and on an opposite side of said rotational axis to said core part portions.

* * * * *